US012748903B2

(12) United States Patent
Klair et al.

(10) Patent No.: US 12,748,903 B2
(45) Date of Patent: Sep. 29, 2026

(54) ADAPTABLE FRAMEWORK FOR CIRCUIT DESIGN SIMULATION VERIFICATION

(71) Applicant: Xilinx, Inc., San Jose, CA (US)

(72) Inventors: Rajvinder S. Klair, San Jose, CA (US); Saikat Bandyopadhyay, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 944 days.

(21) Appl. No.: 18/049,585

(22) Filed: Oct. 25, 2022

(65) Prior Publication Data

US 2024/0135074 A1 Apr. 25, 2024
US 2024/0232482 A9 Jul. 11, 2024

(51) Int. Cl.
*G06F 30/33* (2020.01)
*G06F 30/31* (2020.01)
*G06F 111/20* (2020.01)

(52) U.S. Cl.
CPC .............. *G06F 30/33* (2020.01); *G06F 30/31* (2020.01); *G06F 2111/20* (2020.01)

(58) Field of Classification Search
CPC ........................................................ G06F 30/33
USPC .......................................................... 716/106
See application file for complete search history.

(56) References Cited

U.S. PATENT DOCUMENTS 7,197,445 B1 3/2007 Deepak et al.
7,302,377 B1 11/2007 Deepak
7,330,808 B1 2/2008 Jorgensen et al.
7,451,417 B1 11/2008 Campbell
7,590,137 B1 9/2009 Chan
7,636,653 B1 12/2009 Chan
7,673,201 B1 3/2010 Chan
7,707,019 B1 4/2010 Ballagh et al.
7,721,090 B1 5/2010 Deepak et al.
7,739,092 B1 6/2010 Ballagh et al.
7,895,026 B1 2/2011 Kelly et al.
7,930,162 B1 4/2011 Chan et al.
8,041,553 B1 10/2011 Hernandez et al.
8,074,077 B1 12/2011 Neema et al.
8,150,638 B1 4/2012 Wu et al.
8,195,441 B1 6/2012 Ou et al.
8,352,229 B1 * 1/2013 Ma ........................ G06F 30/331
703/13
8,769,448 B1 7/2014 Sundararajan et al.
9,117,043 B1 8/2015 Huang et al.
9,223,910 B1 12/2015 Ghosh et al.
9,811,618 B1 11/2017 Parekh et al.
10,296,673 B1 5/2019 Ghosh et al.

(Continued)

*Primary Examiner* — Eric D Lee
(74) *Attorney, Agent, or Firm* — Kevin T. Cuenot

(57) ABSTRACT

An adaptable framework for circuit design simulation verification generates a simulation database for a circuit design and processed design data for the circuit design. The processed design data includes source files for the circuit design referenced by the simulation database. The simulation database and the processed design data are exported from a host integrated development environment (IDE). A template writer configured to generate a simulation script for the circuit design using the simulation database is provided. The simulation script is generated by executing the template writer. The simulation script is generated according to one or more user-specified parameters of the template writer using the simulation database and the processed design data as exported.

20 Claims, 12 Drawing Sheets

(56) References Cited

U.S. PATENT DOCUMENTS

| | | | |
|---|---|---|---|
| 10,437,946 | B1 | 10/2019 | Kasat et al. |
| 10,437,949 | B1 | 10/2019 | Mihalache et al. |
| 10,671,785 | B1 | 6/2020 | Mihalache et al. |
| 10,816,600 | B1 | 10/2020 | Liddell et al. |
| 11,443,088 | B1 | 9/2022 | Verma et al. |
| 11,475,199 | B1 | 10/2022 | Bandyopadhyay et al. |

* cited by examiner

120

```
{
    "name": "Project"
    "purpose": "Design information used by template writers for writing target script",
    “version": " 1.0",
    "product": "Vivado",
    "clib": "clibs/vcs/S-2021.09-SP2/line64/lib",
    "index_file": "synopsys_sim.setup",
    "glbl": "<install>/Vivado/2022.2/data/verilog/src/glbl.v",
    "sim_top": "bft_tb",
    "options": [
        {
            "vhdl": "-full64 -1 vhdlan.log"
            "verilog": "-full64 -1 vlogan.log",
            "vcs": "-full64 -debug_acc+pp+dmptf -t ps -licqueue -1 elaborate.log", "simv": “-ucli
            -licqueue -1 simulate.log"
        }
    ],
    "sources": [
        {
            "filename": "FifoBuffer.v",
            "filepath": "bft_hdl/FifoBuffer.v",
            "filetype": "Verilog",
            "library": "xil_defaultlib",
            "tool": "vlogan"
        },
        ...
        {
            "filename": "bft_tb.v",
            "filepath": "bft_hdl/tb/bft_tb.v",
            "filetype": "Verilog",
            "library": "xil_defaultlib",
            "tool": "vlogan"
        }
    ]
}
```

FIG. 3

140

```
#!/usr/bin/python
import os
import json

# global vars
lib_dir = "vcs_lib"

# write compiled library path
def wr_clib_path(fs,data):
        fs.write(str("clib := {}"+"\n").format(data["clib"]))
        fs.write(str("index_file := {}"+"\n").format(data[ "index_file"J))

# write glbl.v path
def wr_glbl_path(fs,data):
        fs.write(str("glbl := {}"+"\n").format(data["glbl"]))

# read/write options
def wr_options(fs,data):
        for line in data['options']:
                vhd = line["vhdl"]
        v = line["verilog"]
        vcs = line["vcs"]
        simv = line["simv"]
        fs.write(str("{} := {}"+"\n"),format("vhdlan_opts",vhd))
        fs.write(str("{} := {}"+"\n").format("vlogan_opts",v))
        fs.write(str("{} := {}"+"\n").format("vcs_opts",vcs))
        fs.write(str("{} := {}"+"\n").format("simv_opts",simv))

# copy pre-compile library index file
def wr_copy_index_file(fs,data):
        fs.write("\n")
        fs.write("copy_lib_index:\n")
        fs.write(" @cp -f $(clib)/$(index_file) .\n")
```

FIG. 4A

140

```
# get design libraries
def get_design_libs(data):
        lib_list = []
        for line in data['sources']:
                lib= line["library"]
                if (lib not in lib_list):
                lib_list.append(lib)
        return lib_list

# write design sources (compile order)
def wr_design_srcs(fs,data):
        for line in data['sources']:
        tool= line["tool"]
        file_path = line["filepath"]
        lang = line("filetype"J
        opt=""
        if lang == "Verilog":
                opt= "vlogan_opts"
        elif lang == "VHDL":
                opt= "vhdlan_opts"
        library = line["library"]
        fs.write(str(" {}-work{}$({}){}"+"\n").format(tool, library, opt, file_path))

# compile glbl.v file
def wr_compile_glbl(fs,data):
        fs.write("\n")
        fs.write("copy_glbl:\n")
        fs.write(str(" @cp -f $(glbl) ."))
        fs.write("\n")
        fs.write("\n")
        fs.write("compile_glbl: copy_glbl\n")
        fs.write(str(" vlogan -work xil_defaultlib $(vlogan_opts) $(glbl)"))
        fs.write("\n")
```

FIG. 4B

130

```
#!/usr/bin/python
import os
import json
import sdbl

# get db file handle
fj = open('design.json')
# load design database data= json.load(fj)
# get output file handle fm = open("Makefile", "w")
# write compiled library path sdbl.wr_clib_path(fm,data)
# write glbl.v path
sdbl.wr_glbl_path(fm,data)        continued on next page...
# read/write options sdbl.wr_options(fm,data)
# copy pre-compiled library index file sdbl.wr_copy_index_file(fm,data)
fm.write("\n")
fm.write("lib_setup: copy_lib_index\n")
# read design libraries
lib_list = sdbl.get_design_libs(data)
# create design library directory
for lib in lib_list:
        fm.write(str(" @mkdir -p {}/{}"+"\n").format(sdbl.lib_dir,lib))
        fm.write(str(" cat $(index_file) I echo \"{} : {}/{}\"
        »$(index_file)"+"\n").format(lib,sdbl.lib_dir,lib))
# compile glbl.v sdbl.wr_compile_glbl(fm,data)
# write compile target fm.write("\n")
fm.write("compile: lib_setup compile_glbl\n")
# write design sources (compile order) sdbl.wr_design_srcs(fm,data)
# write elaboration target
fm.write("\n")
fm.write("elaborate:\n")
fm.write(str(" vcs $(vcs_opts) xil_defaultlib.{} xil_defaultlib.glbl -o simv\n").format(data["sim_top"]))
# write simulate target
fm.write("\n")
fm.write("simulate:\n")
fm.write(" simv $(simv_opts) -do simulate.do\n")
# close file handle
fj.close()
fm.close()
```

FIG. 6

150

```
create_project -in_memory
set_property target_simulator "vcs" [current_project]
set_property compxlib.vcs_compiled_library_dir $CLIBS [current_project]
set obj [current_fileset -simset]
set_property "vhdlan.more_options" -value "-full64 -1 vhdlan.log" $obj
set_property "vlogan.more_options" -value "-full64 -1 vlogan.log" $obj
set_property "vcs.more_options" -value "-full64 -debug_acc+pp+dmptf -t ps" $obj

read_verilog [glob ./bft_hdl/*.v ./bft_hdl/tb/*.v]
read_vhdl -library bftLib [glob ./bft_hdl/bftlib/*.vhdl]
read_vhdl ./bft_hdl/bft.vhdl

update_compile_order -fileset sources_1
update_compile_order -fileset sim_1

# ****************************
# EXPORT SIMULATION DATABASE
# ****************************
export_sim_db

# ******************
# SET TEMPLATE TYPE
# ******************
set_property template_type make [get_simulators VCS]

# ***************
# WRITE TEMPLATE
# ***************
write_sim_template

# *****************************************
# EXECUTE STEPS (CALL MAKE FILE TARGETS)
# *****************************************
compile
elaborate
simulate
```

FIG. 7

150

```
clib            :=  /proj/xbuilds/HEAD_daily_latest/clibs/vcs/S-2021.09-SP2/lin64/lib
index_file      := synopsys_sim.setup
glbl            := /proj/xbuilds/2822.2_daily_latest/installs/lin64/Vivado/2022.2/data/verilog/src/glbl.v
vhdlan_opts     := -full64 -1 vhdlan.log
vlogan_opts     := -full64 -1 vlogan.log
vcs_opts        := -full64 -debug_acc+pp+dmptf -t ps -licqueue -1 elaborate.log
simv_opts       := -ucli -licqueue -1 simulate.log

copy_lib_index:
        @cp -f $(clib)/$(index_file),

lib_setup: copy_lib_index
        @mkdir -p vcs_lib/xil_defaultlib
        cat $(index_file) l echo "xil_defaultlib: vcs_lib/xil_defaultlib" »$(index_file) @mkdir -p vcs_lib/bftlib
        cat $(index_file) l echo "bftLib: vcs_lib/bftlibn >>$(index_file)

copy_glbl:
        @cp -f $(glbl),

compile_glbl: copy_glbl
        vlogan -work xil_defaultlib $(vlogan_opts) $(glbl)
```

FIG. 8A

150

```
compile_glbl: copy_glbl
	vlogan -work xil_defaultlib $(vlogan_opts) $(glbl)

compile: lib_setup compile_glbl
	vlogan -work xil_defaultlib $(vlogan_opts) bft_hdl/FifoBuffer.v
	vlogan -work xil_defaultlib $(vlogan_opts) bft_hdl/async_fifo.v
	vhdlan -work bftlib $(vhdlan_opts) bft_hdl/bftlib/bft_package.vhdl
	vhdlan -work bftlib $(vhdlan_opts) bft_hdl/bftLib/core_transform.vhdl
	vhdlan -work bftlib $(vhdlan_opts) bft_hdl/bftLib/round_l.vhdl
	vhdlan -work bftlib $(vhdlan_opts) bft_hdl/bftlib/round_2.vhdl
	vhdlan -work bftLib $(vhdlan_opts) bft_hdl/bftlib/round_3.vhdl
	vhdlan -work bftlib $(vhdlan_opts) bft_hdl/bftLib/round_4.vhdl
	vhdlan -work xil_defaultlib $(vhdlan_opts) bft_hdl/bft.vhdl
	vlogan -work xil_defaultlib $(vlogan_opts) bft_hdl/tb/bft_tb.v

elaborate:
	vcs $(vcs_opts) xil_defaultlib.bft_tb xil_defaultlib.glbl -o simv

simulate:
	simv $(simv_opts) -do simulate.do
```

FIG. 8B

ADAPTABLE FRAMEWORK FOR CIRCUIT DESIGN SIMULATION VERIFICATION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to simulation verification of circuit designs for integrated circuits and, more particularly, to a flexible framework for simulation verification of such circuit designs.

BACKGROUND

Within the Electronic Design Automation (EDA) industry, simulation verification tools are often script-driven. For example, an integrated development environment (IDE) used to create a circuit design typically generates simulation scripts that, when executed, perform functions such as compilation, elaboration, and simulation of the circuit design being developed. The simulation scripts execute within the IDE since the design data for the circuit design that is used by the simulation scripts at execution is contained in the project files of the IDE. In this sense, the simulation scripts are tethered to the IDE.

Presently, there is no standard format for circuit design simulation scripts. The simulation scripts that are generated are fixed or static in nature. Some users may desire simulation scripts to be generated in a particular format and/or with particular functionality that better suits the user's needs. This may include having a script formatted so as to better integrate with the user's inhouse verification tools. Presently, however, changing the generated simulation scripts is a manual process that is cumbersome and error prone. Modifications to the simulation scripts require extensive knowledge of scripting in general, including design/project metadata information, and the verification tools with which the simulation scripts are to be used and/or integrated.

SUMMARY

In one or more example implementations, a method includes generating a simulation database for a circuit design and processed design data for the circuit design. The processed design data includes source files for the circuit design referenced by the simulation database. The method includes exporting the simulation database and the processed design data from a host integrated development environment (IDE). The method includes providing a template writer configured to generate a simulation script for the circuit design using the simulation database. The method also includes generating the simulation script by executing the template writer. The simulation script is generated according to one or more user-specified parameters of the template writer using the simulation database and the processed design data as exported.

The foregoing and other implementations can each optionally include one or more of the following features, alone or in combination. Some example implementations include all the following features in combination.

In one aspect, the template writer calls one or more class library application programming interfaces that operate on the simulation database to generate the simulation script.

In another aspect, the class library application programming interfaces include one or more user-contributed application programming interfaces that extend the functionality of the template writer.

In another aspect, the simulation database includes complete information for compiling, elaborating, and simulating the circuit design.

In another aspect, the one or more user-specified parameters indicate a type and a number of simulation scripts to generate.

In another aspect, the type and the number of simulation scripts are selected from a 3-step option including separate compile, elaborate, and simulate scripts and a makefile option including a single script configured to perform compilation, elaboration, and simulation.

In another aspect, the one or more user-specified parameters indicate a scripting language in which to generate the simulation script.

In another aspect, the one or more user-specified parameters indicate a script format of basic or advanced.

In another aspect, generating the simulation script by executing the template writer is performed in a standalone computing environment that is independent of the host IDE.

In one or more example implementations, a system includes one or more processors. The processors are configured to initiate and/or execute the various operations described within this disclosure.

In one or more example implementations, a computer program product includes one or more computer readable storage mediums having program instructions embodied therewith. The program instructions are executable by one or more processors to cause the one or more processors to execute the various operations described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example of a simulation database.

FIGS. 4A and 4B, taken collectively, illustrate an example of a class library.

FIG. 6 illustrates example program code of a template writer configured to generate a make file.

FIG. 7 illustrates an example of a simulation script generated using a make utility.

FIGS. 8A and 8B, taken collectively, illustrate an example of another simulation script generated using the make utility.

DETAILED DESCRIPTION

Figure 1:
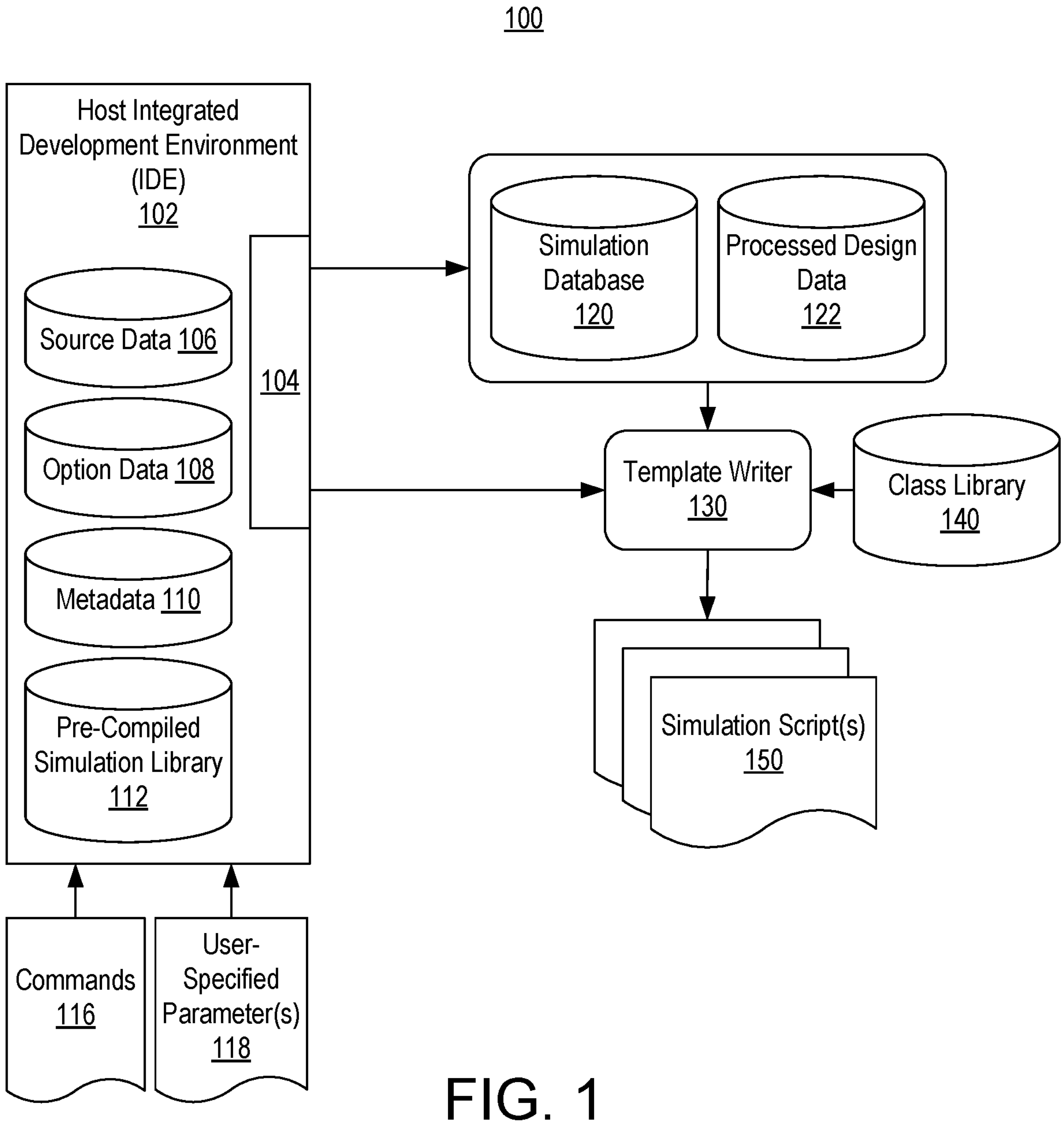
FIG. 1 illustrates an example architecture for an adaptable framework for circuit design simulation verification.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to simulation verification of circuit designs for integrated circuits and, more particularly, to a flexible framework to facilitate simulation verification of such circuit designs. In accordance with the inventive arrangements described within this disclosure, methods, systems, and computer program products are provided that implement a middle layer as part of an Electronic Design Automation (EDA) system. The middle layer, or framework, facilitates greater user control over circuit design simulation verification and the generation of simulation scripts for the circuit design.

In one or more examples, for a particular circuit design, the framework is capable of exporting information such as the original source files for the circuit design and a simulation database for the circuit design. Exporting the information described frees the data from the original integrated development environment (IDE) used by the circuit designer to create the circuit design. One or more template writers are generated and output by the framework. The template writer is configured to generate, from the original source files and simulation database as exported, one or more simulation scripts for performing simulation verification of the circuit design. The template writer is user customizable to generate different types of simulation scripts with varying levels of complexity. That is, a user may edit one or more parameters of the template writer, e.g., template writer properties within the template writer, to specify the particular type of simulation scripts that are to be generated.

The inventive arrangements allow a user to create simulation script(s) that may be used by other users (e.g., verification engineers) to perform simulation verification without having to access or use to the original IDE (e.g., design tools) and/or original IDE project file(s) for the circuit design. The exportation of the source files and creation of the simulation database provides all information necessary for simulation script generation and simulation of the circuit design. The ability of the user to customize the template writer provides added flexibility as described in greater detail below.

The inventive arrangements provide a clean separation between the functions of a circuit designer that implements or creates a circuit design and a verification engineer that is tasked with certifying the operability and/or functionality of the circuit design. Once a circuit designer implements a solution (i.e., a circuit design), a verification engineer may use the exported data with the template writer to generate simulation scripts and execute the simulation scripts to run and/or perform verification iterations on the circuit design. As noted, the verification engineer does not require use of the original IDE used to generate the circuit design since the complete simulation information including the source files is available outside of the IDE.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features. Further aspects of the inventive arrangements are described below with reference to the figures.

Figure 2:
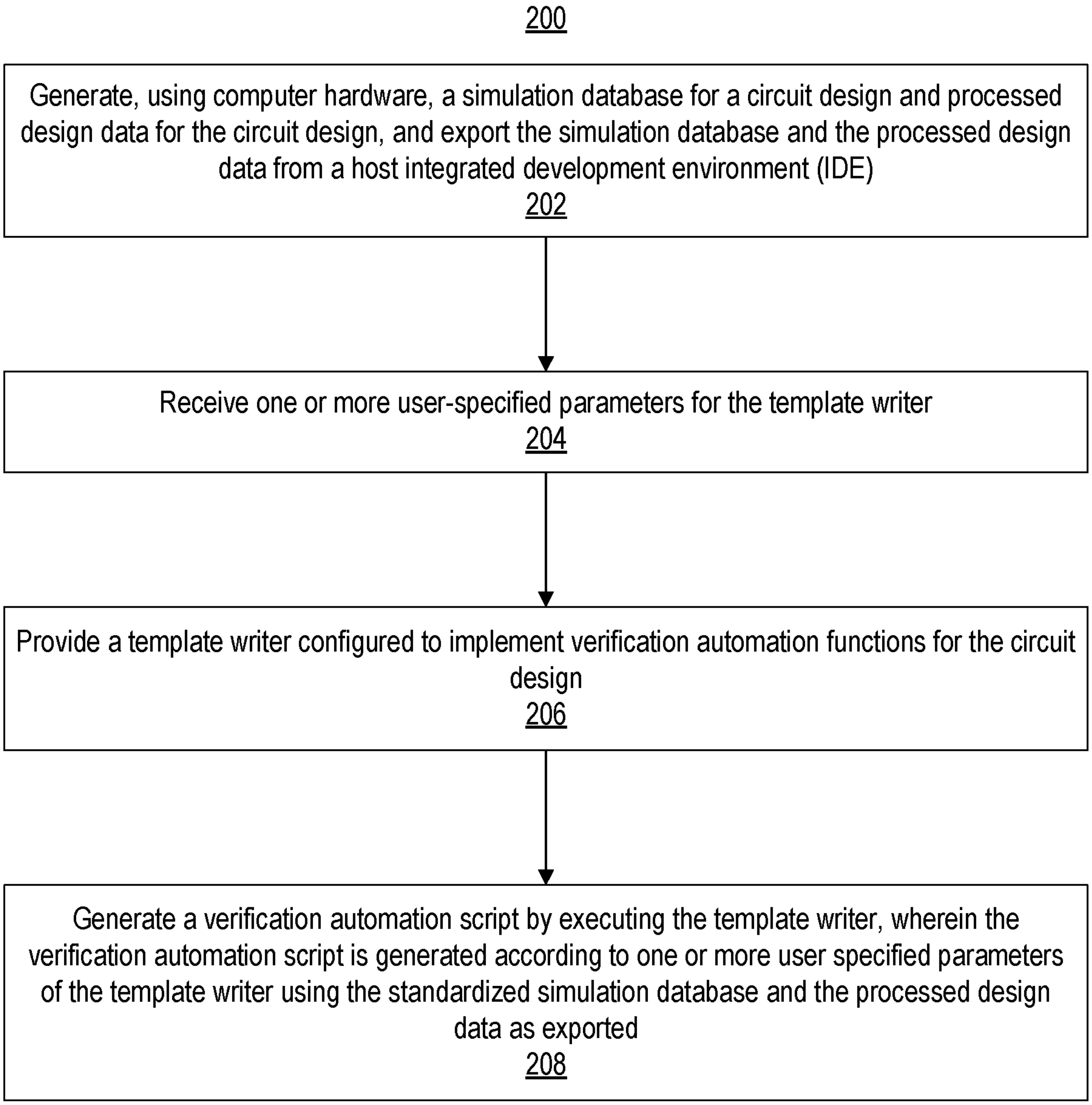
FIG. 2 illustrates an example method of operation of the export interface as executed by a data processing system.

FIG. 1 illustrates an example architecture 100 for an adaptable framework for circuit design simulation verification. Architecture 100 may be executed by a data processing system as described herein in connection with FIG. 10. FIG. 2 illustrates an example method 200 of operation of host IDE 102 including export interface 104 as executed by a data processing system. In general, architecture 100 implements a methodology to create simulation scripts for a circuit design specified as a project, an IP core, or a source compile order from an exported simulation database using a template writer. The template writer executes class library Application Programming Interfaces (APIs) to extract and process the design information.

As illustrated, architecture 100 includes a host IDE 102. Host IDE 102 includes an export interface 104 and various types of data such as source data 106, option data 108, metadata 110, and pre-compiled simulation library 112. The aforementioned components, taken collectively, constitute a circuit design. Referring to FIGS. 1 and 2, a user may be working with host IDE 102. In doing so, responsive to user provided input, host IDE 102 creates or opens a project (e.g., for a circuit design), reads an IP core or a block design (BD), or receives a compile order specifying design information in RTL/SystemC/C++/C or in another computer-based programming language (e.g., another high-level programming language or a hardware description language). The user may also specify simulator tool settings.

Source data 106 includes the project file(s) in which the circuit design is created or specified, any Intellectual Property (IP) core source code files, and/or a compile order. The compile order may specify the order in which components (e.g., modules of program code and/or IP cores) of the circuit design are to be compiled.

As defined herein, the term “Intellectual Property core” or “IP core” means a pre-designed and reusable unit of logic or circuit design, a cell, or a portion of chip layout design in the field of electronic circuit design. An IP core may be expressed as a data structure specifying a description of circuitry that performs a particular function. An IP core may be expressed using hardware description language file(s), as a netlist, as a bitstream that programs a programmable IC, or the like. An IP core may be used as a building block within circuit designs adapted for implementation within an IC.

An IP core may include additional resources such as source code, scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

Option data 108 may specify one or more filesets and/or an input file. A fileset, as part of a project of host IDE 102, is a list of files having a specific function within the project. For purposes of illustration, one or more constraint files is a constraint set while one or more simulation test benches is a simulation set. The input file may be a list of parameter settings that are to be applied the host IDE 102 while using the project. For example, the input file may specify simulator tool settings.

Metadata 110 can include various types of data such as memory ("mem") files and/or CDO files. Memory files are files that include data that may be used to initialize one or more physical memories of the circuit design once implemented in an integrated circuit. CDO files are binary files created by host IDE 102 to program some portion of a target programmable IC in which the circuit design is to be physically realized based on user-specified configuration(s) for clocks, PLLs, and input/output pins. CDOs may be included as part of a programmable device image (PDI), which is a file, or container file, that includes all of the configuration binary files for a given programmable IC and the executable files used to execute the binary files.

Pre-compiled simulation library 112 includes one or more pre-compiled and executable simulation models representing the various components of the circuit design. The pre-compiled execution models may be used to simulate the circuit design.

In the example of FIG. 1, at least initially, the various types of data 106, 108, 110, and 112 are contained within host IDE 102. That is, the information is accessed by way of, or by using, host IDE 102.

Referring to FIGS. 1 and 2 collectively, in block 202, the host IDE 102 generates a simulation database 120 for a circuit design and processed design data 122 for the circuit design. Further, the host IDE 102 exports the simulation database 120 and the processed design data 122.

For example, a user may provide one or more commands 116 to host IDE 102. The user may provide a command such as an "export_sim_db" as an input to host IDE 102. In response to receiving the "export_sim_db" command, export interface 104 extracts design information for the circuit design from the various data sources illustrated within host IDE 102 and outputs the design information formatted as simulation database 120.

In one aspect, simulation database 120 is specified a standardized format. For example, simulation database 120 may be specified as a JavaScript Object Notation (JSON) file. JSON is a lightweight format that is self-describing and that is capable of storing data in a structured format. It should be appreciated that simulation database 120 may be specified in other formats such as a YAML file or the like and that use of JSON is for purposes of illustration and not limitation. Processed design data 122 includes source files for the circuit design from source data 106. The source files include any of the files from source data 106 and/or pre-compiled simulation library 112.

Export interface 104 is capable of exporting processed design data 122 to a particular destination such as a directory. Processed design data 122 may be stored as a collection of files or as a container file including the various source files described.

Simulation database 120 specifies option data 108, metadata 110, and paths to the various source files, e.g., physical data, included processed design data 122. It should be appreciated that the various paths and/or references specified in simulation database 120 refer to data items contained in processed design data 122 and not to any items contained in host IDE 102. That is, the paths specified in simulation database point to processed design data 122 as exported and not to source data 106 and/or pre-compiled simulation library 112. In this regard, the combination of simulation database 120 and processed design data 122 exists independently of, and distinctly from, any project or other data for the circuit design that may exist in host IDE 102. In general, simulation database 120 includes complete information (e.g., all of the information necessary) for compiling, elaborating, and simulating the circuit design independently (e.g., without using) host IDE 102 or the project for the circuit design contained in host IDE 102.

FIG. 3 illustrates an example simulation database 120. In the example of FIG. 3, simulation database 120 is specified as a JSON file. As illustrated, simulation database 120 lists various items of metadata relating to the circuit design such as the name of the project, the particular host IDE tool that generated the JSON file, the simulation top, the particular simulation options to be used, and the source files for the circuit design.

In block 204, one or more user-specified parameters 118 for the template writer 130 optionally may be received. In one aspect, the one or more user-specified parameters 118 indicate a type and number of simulation scripts to generate.

For purposes of illustration, the particular type simulation scripts to generate may be specified as an output option in template writer 130 (e.g., as one or more template writer properties). The output option may be set a command to set user-specified parameters 118 such as "% set_property_template_type "make" [get_simulators <name>]." In the example, the selected option is the Makefile option as indicated by the "make" parameter value. Other example values that may be specified include "3-step" which may be the default value if nothing is specified, "single-step," or "custom." The simulator name may be specified as <name>. Examples of available simulators that may be specified include, but are not limited to, "xsim," "modelsim," "questa," "xcelium," "vcs," and "riviera."

In one or more other examples, the user-specified parameters 118 may indicate or specify a particular scripting language in which to generate the simulation script(s). As an illustrative and non-limiting example, the user-specified parameters may specify that the script(s) to be generated are to be generated in Python, Tcl, or other suitable scripting language.

In one or more other examples, the user-specified parameters 118 may indicate or specify whether the script is to have a basic or advanced format. For example, the default makefile option described in greater detail in connection with FIG. 5 may use a basic structure that is suitable for novice users. An advanced format may be specified to indicate desired options such as parallelism in performing particular tasks such as compilation of IP cores of the circuit design, including support for cloud computing, workload management systems (e.g., job schedulers), or the like.

For example, any dependencies between different modules (e.g., program code modules of the circuit design) and/or IP cores of the circuit design may be specified via the simulation database 120. Including support for cloud computing may include the use of a customized template that is configured to invoke parallel compilation of two or more modules and/or IP cores of the circuit design that are identified as being independent of one another. Such operations may be invoked using the more advanced format that is customized to take advantage (e.g., invoke) available parallel processing functionality in a particular computing machine and/or cloud-based computing environment.

As an illustrative and non-limiting example, a cloud-based computing environment may utilize a workload management solution or other load sharing facility that is configured to provide job scheduling to support high-performance computing. In this manner, using the advanced format allows the inventive arrangements to improve computing performance by leveraging available compute resources to parallelize particular operations such as compiling independent portions of the circuit design to reduce runtime.

In block 206, a template writer 130 is provided. Template writer 130 may be specified as a script that is configured to generate, upon execution, one or more simulation scripts that initiate or perform verification functions for the circuit design. For example, template writer 130 may be generated by export interface 104 and exported. Template writer 130, as exported, may be executed to generate one or more simulation scripts for the circuit design.

In an example implementation, the user may enter a command 116 for generating a make file such as "% write_sim_template <override-settings>." In this example, the command causes host IDE 102 to generate a "wr_make_tmpl.py" file that is executed during a simulation setup step. The user has the option to override established tool settings that were fetched from simulation database 120 for design exploration purposes.

In the example of FIG. 1, template writer 130 utilizes a class library 140 of application programming interfaces (APIs). Template writer 130 includes one or more function calls to the API(s) of class library 140 to generate the desired simulation script(s) for performing simulation verification of the circuit design.

FIGS. 4A and 4B, taken collectively and referred to collectively as FIG. 4, illustrate an example class library 140. The class library 140 of FIG. 4 may be specified in a file called "sdbl.py" as Python program code. The example of FIG. 4 illustrates a variety of different APIs including a "write compiled library path" API, a "write glbl.v path" API, a "read/write options" API, a "copy pre-compiled library index file" API, a "get design libraries" API, a "write design sources" API, and a "compile" API.

In one aspect, class library 140 is user-customizable. That is, a user or users may add or contribute any custom or user-specified functions to class library 140 thereby allowing the functionality of template writer 130 to be extended and/or customized depending on the particular type and/or formatting of the simulation script desired.

Figure 5:
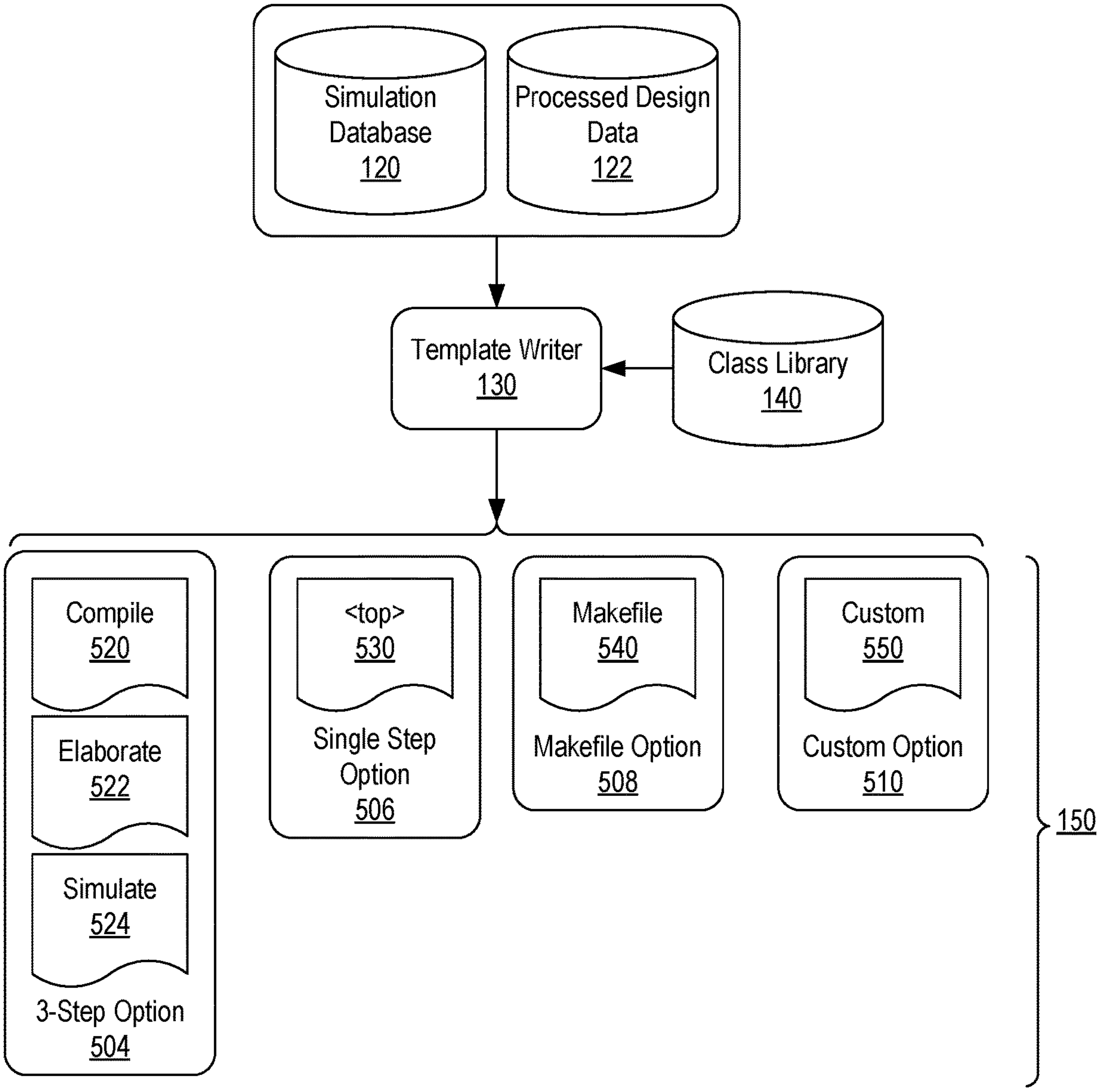
FIG. 5 illustrates an example of the different types of simulation scripts that may be generated by a template writer.

FIG. 5 illustrates an example of the different types of simulation scripts that may be generated by template writer 130. The particular option(s) that is/are generated are determined by the user-specified parameters 118 provided to host IDE 102 and incorporated into template writer 130 as one or more template writer properties. In one aspect, the user may open template writer 130 within an editor and modify one or more values for parameters contained in the template writer 130 to cause template writer 130 to generate the desired type of simulation script shown as options 504, 506, 508, and/or 510.

Option 504 is the "3-step option" in that template writer 130 generates three different scripts. The three different scripts include a compile script 520, an elaborate script 522, and a simulate script 524. Upon execution, each script causes a data processing system to perform compilation, elaboration, or simulation of the circuit design as each respective name suggests. The compilation, elaboration, and simulation operations invoke particular EDA tools specified within the respective scripts to perform compilation, elaboration, and simulation, respectively, using simulation database 120 and processed design data 122. As such, the operations may be performed in standalone manner without using or accessing host IDE 102 or any project of host IDE 102.

Option 506 is referred to as a "single step" option. Option 506 generates a single script 530 that is configured to initiate the compilation, elaboration, and simulation operations. Again, the single step option specifies the particular EDA tool to be invoked to perform the respective operations.

Option 508 is referred to as the "makefile" option and generates a makefile 540. Makefile 540 is a text file that includes one or more rules for hardware implementation. Makefile 540, for example, may invoke a make utility that controls execution and operation of EDA tools to perform the operations of compilation, elaboration, and/or simulation in accordance with any rules specified within makefile 540. For example, a command such as "make" may be received as a command line input. A more complex form of the command may be typed, for example, if makefile 540 is stored in a different directory than the directory where the make command is typed. Responsive to the make command, the make utility executes makefile 540. In executing makefile 540, the make utility controls operation of the EDA tools in accordance with rules specified within makefile 540.

Option 510 is referred to as the "custom" option and generates custom script 550 as the simulation script. Custom script 550 may include any of a variety of different features added or included using user-specified class library APIs that extend the functionality of template writer 130.

Thus, based on the user-specified parameters 118 incorporated into template writer 130, template writer 130, upon execution, is capable of generating the simulation script(s) corresponding to option 504, 506, 508, and/or 510. The specification of particular options as described herein via user-specified parameters 118 causes different combinations of APIs of the template writer 130 to be executed to generate the intended type of simulation script(s) 150. This allows the end user to specify, by way of user-specified parameters 118, the type and number of simulation scripts generated by template writer 130.

FIG. 6 illustrates an example program code that may be included in template writer 130 to generate a makefile.

In block 208, template writer 130 may be executed using a data processing system. The data processing system used to execute template writer 130 may be different from the data processing system that executes host IDE 102. Template writer 130 executes to generate one or more simulation scripts 150. The particular simulation script(s) 150 generated are created according to the one or more user-specified parameters 118 of template writer 130. Further, template writer 130 generates the one or more simulation scripts 150 using the simulation database 120 and the processed design data 122 as exported.

For example, the user may run simulation steps for simulation verification of the circuit design in the IDE Tcl console (%<step-comd>) such as "compile," "elaborate," and "simulate". Continuing with the Makefile example, the compile command internally calls the "setup" step to execute template writer 130 to create "Makefile" and then calls the compile target defined in the make file. The elaborate and simulate operations call respective targets defined in the make file. The Makefile will be generated only once during compile step and consumed by elaborate and simulate steps.

For purposes of illustration, and referring to the Example 1 below, in response to the user issuing a "compile" command, the Python "python wr_make_tmpl.py" will generate Makefile. Then "make compile" will execute the "compile" target from Makefile. The "wr_make_tmpl.py" will be generated by the "write_sim_template" command.

Example 1

```
Execute "compile" command:-
#!/bin/env bash
export PYTHONPATH='pwd'/../..:$PYTHONPATH
python wr_make_tmpl.py
make compile
Execute "elaborate" command:-
#!/bin/env bash
make elaborate
Execute "simulate" command:-
#!/bin/env bash
make simulate
```

In generating the simulation script(s), template writer 130 calls one or more APIs of class library 140. The APIs operate on simulation database 120 and processed design data 122 to generate the simulation script(s) 150. As such, the simulation script(s) 150 may be generated in a standalone computing environment that is independent of the host IDE 102 and/or of any project files of host IDE 102.

FIG. 7 illustrates an example of a simulation script 150 generated using the make utility where template writer 130 is configured to generate output simulation scripts 150 using the makefile option 508. In the example of FIG. 7, simulation script 150 includes steps for simulation of a circuit design called "BFT" using the "make" methodology. Simulation script 150, upon execution, creates a project in memory of the data processing system, sets options on the simulation fileset, reads the circuit design, updates the compile order, exports the simulation database as simulation database 120, sets the template type requested, writes the Makefile, and then calls the compile, elaborate, and simulate Tcl commands.

FIGS. 8A and 8B, taken collectively and referred to collectively as FIG. 8, illustrate an example of another simulation script 150 generated using the make utility where template writer 130 is configured to generate simulation scripts 150 using the makefile option 508. In the example of FIG. 8, simulation script 150 is generated by "wr_make_tmpl.py" function for the BFT circuit design targeting the VCS simulator. Template writer 130 extracts information from simulation database 120 that was created by the "export_sim_design" command. In this example, the Makefile uses the default option with a basic structure created for novice users.

Figure 9:
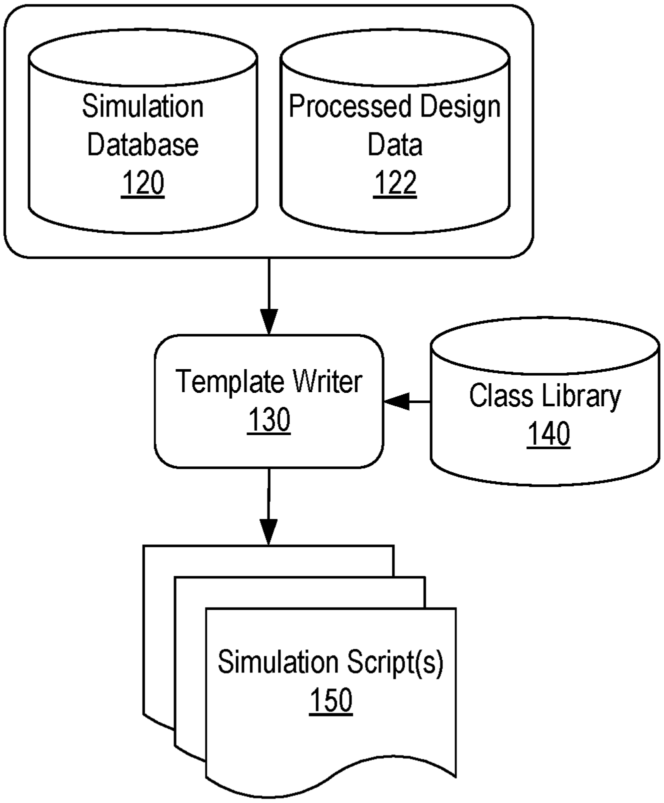
FIG. 9 illustrates an example of standalone circuit design verification using components of the framework of FIG. 1.

FIG. 9 illustrates an example of standalone circuit design verification that may be performed. In the example of FIG. 9, the host IDE 102 is not available. The components illustrated in FIG. 9 may be executed in a data processing system such described in connection with FIG. 10 to perform circuit design simulation verification in a standalone manner where only template writer 130 executes by invoking functions of class library 140 to operate on simulation database 120 and processed design data 122 to generate simulation script(s) 150. As such, a verification engineer may use the components illustrated (e.g., only the components illustrated in FIG. 9) to simulate the circuit design in a standalone environment outside (e.g., without the use of or access to) host IDE 102 where template writer 130 extracts information and generates the simulation script(s) 150.

The inventive arrangements described within this disclosure provide a flexible and powerful way of creating circuit design simulation scripts using one or more template writers. The template writers are customizable. In one aspect, the template writers may be generated and stored in a source code repository and/or version control system. In this manner, the template writers may be checked out and/or otherwise made available to users through such systems for independent and/or standalone use. Users may download or check out template writers and/or upload new template writers as developed to provide increased control over execution and flow of simulation verification.

By way of the export operations that generate the simulation database 120, which is specified in a standardized format, and processed design data 122, the template writers have access to all the simulation information necessary to simulate the circuit designs without accessing the original project files and/or host IDE 102. The editable and configurable template writers, which may be extended through addition of additional class library APIs, allow end users to update the template writers to generate highly customized circuit design simulation scripts thereby avoiding the need for manual editing of simulation scripts. Further, users are able to integrate such simulation scripts with internal or in-house tools.

Figure 10:
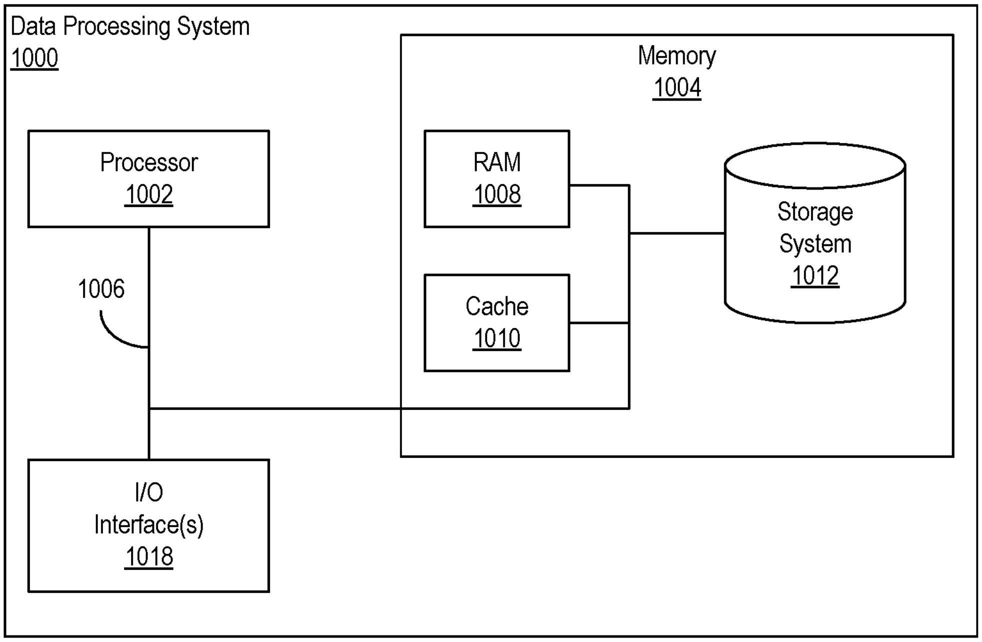
FIG. 10 illustrates an example implementation of a data processing system for use with the inventive arrangements described within this disclosure.

FIG. 10 illustrates an example implementation of a data processing system 1000. As defined herein, the term "data processing system" means one or more hardware systems configured to process data, each hardware system including at least one processor and memory, wherein the processor is programmed with computer-readable instructions that, upon execution, initiate operations. Data processing system 1000 can include a processor 1002, a memory 1004, and a bus 1006 that couples various system components including memory 1004 to processor 1002.

Processor 1002 may be implemented as one or more hardware processors. In an example, processor 1002 is implemented as a central processing unit (CPU). Processor 1002, being hardware, may be implemented as one or more circuits capable of carrying out instructions contained in program code. The circuit may be an integrated circuit or embedded in an integrated circuit. Processor 1002 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1006 represents one or more of any of a variety of communication bus structures. By way of example, and not limitation, bus 1006 may be implemented as a Peripheral Component Interconnect Express (PCIe) bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Memory 1004 is capable of storing computer-readable program instructions that are executable by processor 1002. For example, the computer-readable program instructions can include an operating system, one or more application programs, other program code, and program data. The computer-readable program instructions may implement architecture illustrated in any one or more of FIGS. 1, 5, and/or 9.

Processor 1002, in executing the computer-readable program instructions, is capable of performing the various operations described herein that are attributable to a computer. It should be appreciated that data items used, generated, and/or operated upon by data processing system 1000 are functional data structures that impart functionality when employed by data processing system 1000. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1000 may include one or more Input/Output (I/O) interfaces 1018 communicatively linked to bus 1006. I/O interface(s) 1018 allow data processing system 1000 to communicate with one or more external devices and/or communicate over one or more networks such as a local area network (LAN), a wide area network (WAN), and/or a public network (e.g., the Internet). Examples of I/O interfaces 1018 may include, but are not limited to, network cards, modems, network adapters, hardware controllers, etc. Examples of external devices also may include devices that allow a user to interact with data processing system 1000 (e.g., a display, a keyboard, and/or a pointing device) and/or other devices such as accelerator card.

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 10 is not intended to suggest any limitation as to the scope of use or functionality of example implementations described herein. Data processing system 1000 is an example of computer hardware that is capable of performing the various operations described within this disclosure. In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used within this disclosure is for the purpose of describing particular examples and implementations only and is not intended to be limiting. Notwithstanding, several definitions that apply throughout this disclosure are presented below.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the terms "program code," "program instructions," and "computer-readable program instructions" are used interchangeably. Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:

generating, using computer hardware, a simulation database for a circuit design and processed design data for the circuit design, wherein the processed design data includes source files for the circuit design referenced by the simulation database;

exporting the simulation database and the processed design data from a host integrated development environment (IDE);

providing a template writer configured to generate a simulation script for the circuit design using the simulation database; and generating the simulation script by executing the template writer, wherein the simulation script is generated according to one or more user-specified parameters of the template writer using the simulation database and the processed design data as exported;

wherein the simulation script is executable to simulate the circuit design based on the simulation database and the processed design data as exported without access to the host IDE.

2. The method of claim 1, wherein the template writer calls one or more class library application programming interfaces that operate on the simulation database to generate the simulation script.

3. The method of claim 2, wherein the class library application programming interfaces include one or more user-contributed application programming interfaces that extend functionality of the template writer.

4. The method of claim 1, wherein the simulation database includes complete information for compiling, elaborating, and simulating the circuit design.

5. The method of claim 1, wherein the one or more user-specified parameters indicate a type and a number of simulation scripts to generate.

6. The method of claim 5, wherein the type and the number of simulation scripts are selected from a 3-step option including separate compile, elaborate, and simulate scripts and a makefile option including a single script configured to perform compilation, elaboration, and simulation.

7. The method of claim 1, wherein the one or more user-specified parameters indicate a scripting language in which to generate the simulation script.

8. The method of claim 1, wherein the one or more user-specified parameters indicate a script format of basic or advanced.

9. The method of claim 1, wherein the generating the simulation script by executing the template writer is performed in a standalone computing environment that is independent of the host IDE.

10. A system, comprising:

one or more processors configured to execute operations including:

generating a simulation database for a circuit design and processed design data for the circuit design, wherein the processed design data includes source files for the circuit design referenced by the simulation database;

exporting the simulation database and the processed design data from a host integrated development environment (IDE);

providing a template writer configured to generate a simulation script for the circuit design using the simulation database; and generating the simulation script by executing the template writer, wherein the simulation script is generated according to one or more user-specified parameters of the template writer using the simulation database and the processed design data as exported;

wherein the simulation script is executable to simulate the circuit design based on the simulation database and the processed design data as exported without access to the host IDE.

11. The system of claim 10, wherein the template writer calls one or more class library application programming interfaces that operate on the simulation database to generate the simulation script.

12. The system of claim 11, wherein the class library application programming interfaces include one or more user-contributed application programming interfaces that extend functionality of the template writer.

13. The system of claim 10, wherein the simulation database includes complete information for compiling, elaborating, and simulating the circuit design.

14. The system of claim 10, wherein the one or more user-specified parameters indicate a type and number of simulation scripts to generate.

15. The system of claim 14, wherein the type and number of simulation scripts are selected from a 3-step option including separate compile, elaborate, and simulate scripts and a makefile option including a single script configured to perform compilation, elaboration, and simulation.

16. The system of claim 10, wherein the one or more user-specified parameters indicate a scripting language in which to generate the simulation script.

17. The system of claim 10, wherein the one or more user-specified parameters indicate a script format of basic or advanced.

18. The system of claim 10, wherein the generating the simulation script by executing the template writer is performed in a standalone computing environment that is independent of the host IDE.

19. A computer program product comprising one or more computer readable storage mediums having program instructions embodied therewith, wherein the program instructions are executable by one or more processors to cause the one or more processors to execute operations comprising:

generating a simulation database for a circuit design and processed design data for the circuit design, wherein the processed design data includes source files for the circuit design referenced by the simulation database;

exporting the simulation database and the processed design data from a host integrated development environment (IDE);

providing a template writer configured to generate a simulation script for the circuit design using the simulation database; and generating the simulation script by executing the template writer, wherein the simulation script is generated according to one or more user-specified parameters of the template writer using the simulation database and the processed design data as exported;

wherein the simulation script is executable to simulate the circuit design based on the simulation database and the processed design data as exported without access to the host IDE.

20. The computer program product of claim 19, wherein the template writer calls one or more class library application programming interfaces that operate on the simulation database to generate the simulation script.

* * * * *